Dec. 30, 1930. P. L. ROBERTSON 1,787,087
SCREW DRIVER AND METHOD OF MAKING SAME
Filed March 1, 1929

Inventor:
Peter Lymburner Robertson.
by H.J.S. Dennison
atty.

Patented Dec. 30, 1930

1,787,087

UNITED STATES PATENT OFFICE

PETER L. ROBERTSON, OF MILTON, ONTARIO, CANADA

SCREW DRIVER AND METHOD OF MAKING SAME

Application filed March 1, 1929. Serial No. 343,769.

The principal objects of this invention are, to minimize the cost of manufacture of screw-drivers, particularly of the type used with socket screws or those used with small slotted screws.

A further and important object is to enable the production of such tools with a uniform degree of temper.

The principal features of the invention consist in the novel construction of the bit end of the tool and in the novel manner of securing said bit end in a holder, whereby bits of a construction enabling them to be prepared in quantities are permanently embedded in a stem or holder of a lower and cheaper grade of material than that required for the bit end.

In the drawings, Figure 1 is a perspective view of a completed screw driver constructed in accordance with this invention.

Figure 1:
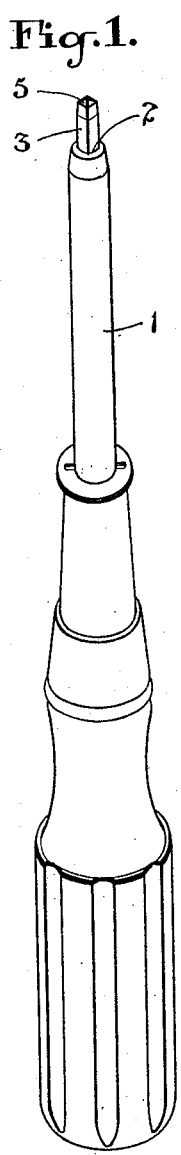
Figure 2:
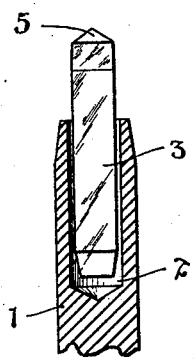
Figure 2 is an enlarged longitudinal sectional view of the bit holding end.
Figures 3, 4:
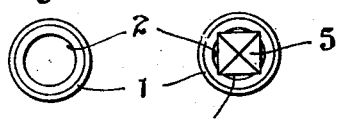
Figure 3 is an enlarged end view of the holder blank.
Figure 4 is an enlarged end view of the holder with the bit inserted.

In the manufacture of screw drivers it has been customary to form the shank of a piece of steel which is capable of being hardened to the necessary condition to withstand the twisting strain necessary in driving screws and the tip of the shank after being properly shaped is tempered to the desired degree.

Such a practice necessitates the use of a considerable quantity of high grade steel for the shanks.

The present invention eliminates the requirement for the use of the high grade steel for the shank and the invention consists in the novel construction of the shank and the bit and the manner of placing these together.

The shank 1 of the screw driver herein shown is formed of a length of soft steel and a cylindrical hole 2 is bored in the end thereof.

The screw driver bit 3 is formed of a length of high carbon steel of a suitable quality, here shown square in cross section and having parallel longitudinal sides.

One end 4 of the bit is slightly tapered and is provided with a pyramidal end 5. This type of bit is used with the socket type of screw.

The parallel-sided bit is inserted into the hole 2 in the end of the shank 1 and the corners of the square bit are embedded in the material of the shank.

The method of inserting the bit into the shank and the peculiar construction of both shank and bit jointly constitute a novel method of manufacturing same and such method is carried out in the following manner.

Figure 5:
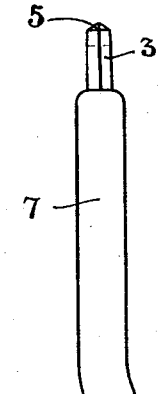
Figure 5 is a perspective detail of a bit constructed for use in a slotted screw.

The bits are cut from a length of square stock of tool steel of a suitable quality and one end thereof is shaped as shown and described to fit the screw. The other end is tapered as shown in Figure 5.

The end of the shank 1 has the round hole 2 bored therein which is of a lesser diameter than the diagonal dimension of the bit.

The bit is held in a suitable holder and the shank is forced on to the end of same.

The corners of the bit embedding themselves into the metal of the shank, which under the pressure applied, stretches slightly across the diagonals and consequently applies a constricting grip upon the bit member which retains it securely in position against any torque which may be applied and also retains it securely against possible dislodgement through the effects and changes of temperature. The bit when thus inserted will not become loose nor can it be dislodged.

The use of the comparatively low grade steel for the shank materially reduces the cost, while the method of making the bits and shaping them separate from the driver handle enables their manufacture in considerable quantity and at the minimum cost.

The bit as shown in Figure 5 is adapted for use with a slotted screw and said bit may be utilized in other forms of holders and because of its parallel sided form, may be grouped securely with others to form a bit of greater width, or it is adaptable for use in other forms of holders as a removable or adjustable tool as the flat parallel sides will engage throughout their length with several bits clamped together to hold each bit in its allotted place without distortion.

It will be understood that a tool constructed in the manner described may be produced at very low cost and the working portion thereof will be of the highest quality.

Figure 6:
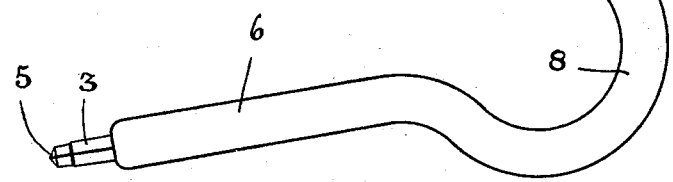
Figure 6 is a perspective view of a utility tool constructed in accordance with this invention.

In the form of the invention illustrated in Figure 6 the tool handle is formed of a piece of common metal stock suitable for a handle and it is bent into a desired shape, preferably with one arm 6 extending at right angles to the other arm 7 and the two members connected by a loop 8.

Each of the arms are bored in the ends and have the bits 3 secured therein.

This form of tool is a utility one, carrying two sizes of bits and is useful in connection with automobile tool kits.

Figure 7:
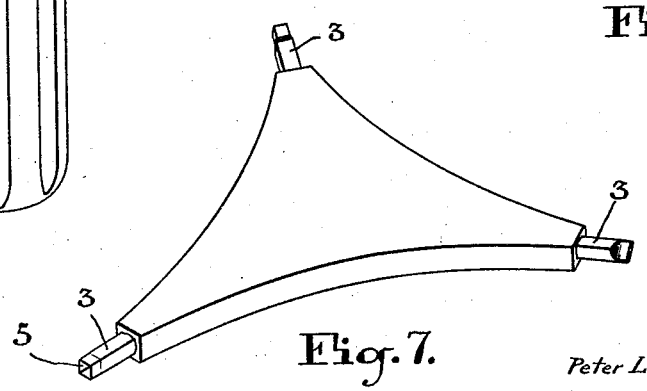
Figure 7 is a perspective view of a further modification of the application of this invention.

The method of forming the tool bits of the tool steel and inserting same into a hole bored in a shank enables the application of such tools to many different forms, one of these is shown in Figure 7 in the form of a flat triangular shaped piece of metal having a hole bored in each of the angles into which a tool is inserted.

This form of application of the invention provides a very handy form of tool, having three different sizes or kinds of tool bits in the one article.

What I claim as my invention is:—

1. A method of making a screw driver consisting in boring a hole in the end of a soft metal shank, forming a bit from a length of longitudinally ridged tool steel tapered at one end and forcing said tapered end into the round hole in the shank deforming the metal, the ridges of said bit being imbedded in the metal of the shank without broaching.

2. A method of making screw drivers, consisting in cutting lengths from a bar of longitudinally ridged tool steel stock, shaping one end as a tool and tapering the other extremity, tempering the member throughout its length, boring a hole of smaller diameter than the diagonal of the bit in a soft metal shank, and finally forcing the tapered end of the hardened tool into the hole in said shank to deform same and place the wall of the bore under lateral tension so that the ridges of said bit are imbedded in said wall.

3. A tool comprising a hardened metal bit having parallel longitudinal edges and a tapered end, and a metal shank having a longitudinal bore of lesser diameter than the diagonals of the bit across the edges, the edges of said bit being forced into and embedded in the metal of the shank and the metal of the shank being under lateral tension permanently gripping said bit edges.

PETER L. ROBERTSON.